United States Patent [19]

Amemiya

[11] Patent Number: 5,288,430
[45] Date of Patent: Feb. 22, 1994

[54] CONDUCTIVE PASTES

[75] Inventor: Chika Amemiya, Tokyo, Japan

[73] Assignee: NEC Corporation, Tokyo, Japan

[21] Appl. No.: 866,491

[22] Filed: Apr. 10, 1992

[30] Foreign Application Priority Data

Apr. 12, 1991 [JP] Japan ................................ 3-079420
Apr. 30, 1991 [JP] Japan ................................ 3-126879

[51] Int. Cl.[5] .......................... H01B 1/00; H01B 1/02
[52] U.S. Cl. .................................. 252/512; 252/512;
252/514; 252/520; 420/417; 420/501; 106/1.26
[58] Field of Search ............... 252/500, 512, 514, 513,
252/518, 520; 420/417, 501; 556/51; 106/1.26

[56] References Cited

U.S. PATENT DOCUMENTS 4,775,414 10/1988 Shoji .................................. 252/514
4,954,926 9/1990 Pepin .................................. 361/321

*Primary Examiner*—Paul Lieberman
*Assistant Examiner*—M. Kopec
*Attorney, Agent, or Firm*—Leydig, Voit & Mayer

[57] ABSTRACT

A conductive paste is provided which is prepared by kneading a composition comprising silver metal powder, an organic vehicle, and a silver-titanium alloy powder contained in an amount of 0.1 to 6.0% by weight based on the amount of the silver metal powder.

12 Claims, 1 Drawing Sheet

CONDUCTIVE PASTES

BACKGROUND OF THE INVENTION

This invention relates to a conductive paste, particularly to a metallic paste for forming internal electrodes used in stacked ceramic capacitors.

A stacked ceramic capacitor is generally produced by blending a mixed ceramic powder with an organic binder, forming the resulting mixture into a sheet, and printing internal electrodes on the sheet using a conductive metallic paste, followed by stacking of such printed sheets, press bonding, cutting, sintering and formation of external electrodes which are connected to the internal electrodes. Such conductive metallic paste to be used for forming internal electrodes is prepared by blending metal powders such as of silver, palladium, etc. with a vehicle consisting of an organic binder and a solvent and kneading the resulting mixture over a triple roll mill and the like.

The ceramic powder particles react with one another to undergo shrinkage during sintering in the process of producing such stacked ceramic capacitor, and thus the ceramic portion is densified. The metal powders contained in the conductive paste applied to the sheets also undergo shrinkage during the sintering to form internal electrodes. Since no chemical bond can be formed between the ceramics and metals, however, adhesion between the ceramics and the internal electrodes is so weak that the internal electrodes separate from the ceramic portions (delamination) due to the difference in the level of sintering shrinkage or of thermal expansion coefficient in the ceramics and that of the metals contained in the internal electrode, and that cracking occurs due to the internal stress in the ceramic portions.

SUMMARY OF THE INVENTION

It is an object of this invention to provide a conductive paste which can prevent separation of internal electrodes from the ceramic portions or cracking of the ceramic portions.

More specifically, this invention is directed to provide a conductive paste which can enhance adhesion between the conductive paste and the ceramic portions and prevent delamination or cracking to be caused due to the difference in the level of sintering shrinkage and in the thermal expansion coefficient therebetween.

In one aspect of this invention, the conductive paste prepared by kneading a silver-containing metal powder, an organic binder and a solvent further contains a silver-titanium alloy. The silver-titanium alloy is characteristically contained in the range of 0.1 to 6.0% by weight based on the amount of the silver powder.

In another aspect of this invention, the conductive paste prepared by kneading a silver-containing metal powder, an organic binder and a solvent further contains a titanium alcoholate. The titanium alcoholate is contained in the range of 1.9 to 9.5% by weight in terms of titanium based on the amount of the silver powder.

According to this invention, the incorporation of the silver-titanium alloy enhances adhesion between the ceramic portions and the internal electrodes, since the silver-titanium alloy contained in the conductive paste is present as such in the internal electrodes and the titanium moiety is oxidized into titanium oxide at the interface with the ceramic portion, whereby the titanium oxide portion is formed continuously with the silver-titanium alloy.

DETAILED DESCRIPTION OF THE PREFERRED EMBODIMENT

Example 1

Figure 1:
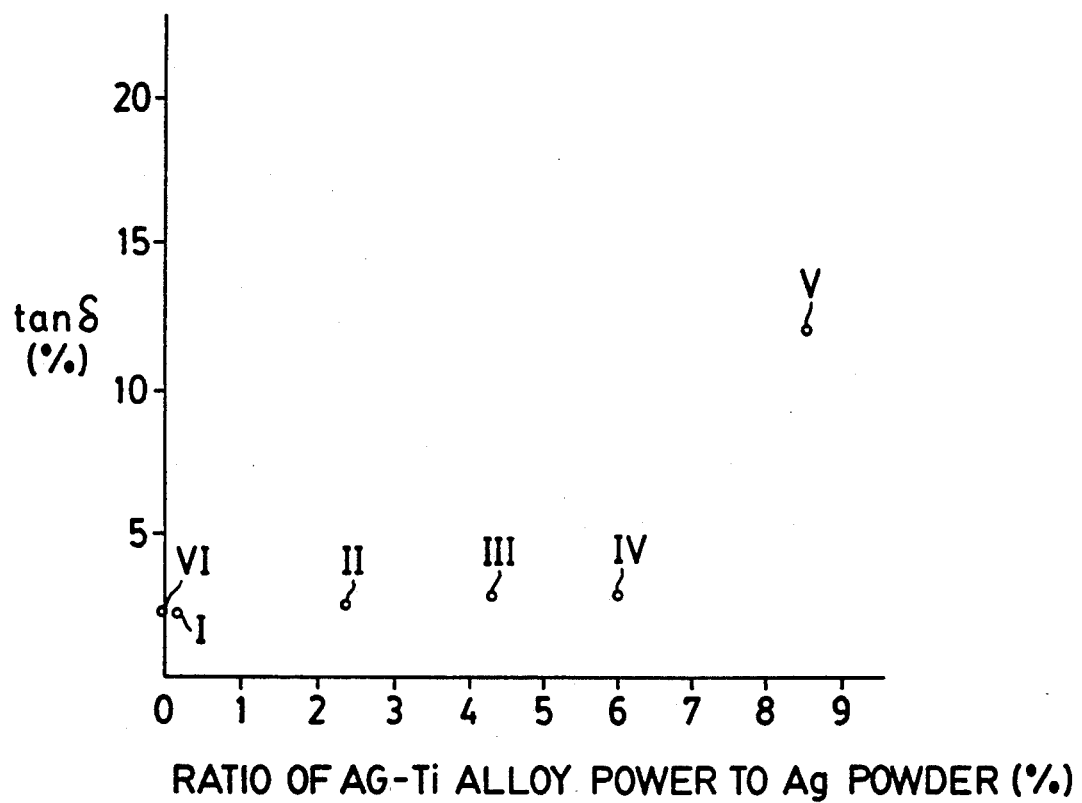
FIG. 1 shows the ratio of silver-titanium alloy relative to the silver powder according to the preferred embodiments of this invention correlated with the electrical properties thereof.

This invention will be described below by way of Examples. Formulations of the conductive pastes according to this invention (Compositions I to V) and that of prior art conductive paste (Composition VI) are shown in Table 1.

TABLE 1

| Electrode coating composition (wt %) | Comp. I | Comp. II | Comp. III | Comp. IV | Comp. V | Comp. VI |
|---|---|---|---|---|---|---|
| Palladium powder | 15 | 15 | 15 | 15 | 15 | 15 |
| Silver powder | 35 | 35 | 35 | 35 | 35 | 35 |
| Silver-titanium alloy powder | 0.05 | 0.85 | 1.5 | 2.1 | 3.0 | 0 |
| Organic vehicle | 49.95 | 49.9 | 48.5 | 47.9 | 47.0 | 50.0 |

The palladium powder and silver powder shown in Table 1 have particle diameters of 0.1 to 0.3 $\mu$m and 0.2 to 0.5 $\mu$m, respectively. The silver-titanium alloy powder has a particle diameters of 0.2 to 0.5 $\mu$m. As the organic vehicle, a mixture of an ethyl cellulose resin and a solvent such as terpineol was used.

The palladium powder and silver powder were preliminarily blended in the amounts as specified in Table 1, and the silver-titanium alloy powder was admixed thereto to provide a mixed metal powder. The mixed metal powder was blended with the organic vehicle, and the resulting mixture was kneaded over a triple roll mill to prepare conductive pastes of compositions I to V, respectively. A predetermined pattern of internal electrodes were printed on 20 $\mu$m thick lead-containing conductive ceramic green sheets using these conductive pastes, and 60 such printed green sheets were stacked and press bonded, followed by culling to provide unsintered stacked ceramic capacitors, respectively. After the unsintered stacked ceramic capacitors were heated to 300° to 400° C. so as to burn off the binder, they were further heated at a heating rate of 100° C./hour and maintained at 1,000° C. for 2 hours, followed by cooling at a rate of 100° C./hour to provide stacked ceramic capacitors.

The thus obtained stacked ceramic capacitors (30,000 pcs.) were examined for delamination and cracking. The results are as shown in Table 2.

TABLE 2

|  | Comp. I | Comp. II | Comp. III | Comp. IV | Comp. V | Comp. VI |
|---|---|---|---|---|---|---|
| Number of delaminated capacitors | 0 | 0 | 0 | 0 | 0 | 1 |
| Number of cracked capacitors | 0 | 0 | 0 | 0 | 0 | 3 |

As shown in Table 2, delamination and cracking can effectively be prevented by using a conductive paste containing a silver-titanium alloy in an amount of 0.1 to 6.0% by weight based on the amount of the silver powder. (0.1%=0.05/35, 6.0%=2.1/35 from the value in Table 1)

If the silver-titanium alloy powder is used in an amount of more than 6.0% by weight, disconnection in the internal electrodes occurs and thus electrical properties of the conductive paste will be lowered, as shown in Table 3 and FIG. 1.

TABLE 3

| Ratio of Ag-Ti alloy powder based on Ag powder (wt %) | 0.14 | 2.43 | 4.29 | 6.00 | 8.57 | 0 |
|---|---|---|---|---|---|---|
| Composition | I | II | III | IV | V | VI |
| Tan δ (%) | 2.2 | 2.6 | 2.7 | 2.6 | 12.0 | 2 |

Example 2

Conductive pastes (Compositions A to E) containing the titanium alcoholates according to this invention and a prior art conductive paste (Composition F) were prepared, respectively. Examples of titanium alcoholates are shown below and the compositions of these pastes are as shown in Table 1.

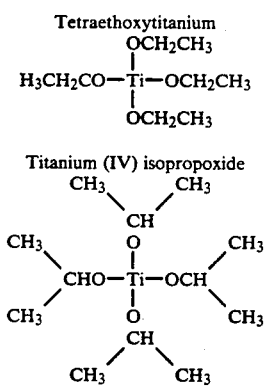

Tetraethoxytitanium $$\text{H}_3\text{CH}_2\text{CO}-\underset{\underset{\text{OCH}_2\text{CH}_3}{|}}{\overset{\overset{\text{OCH}_2\text{CH}_3}{|}}{\text{Ti}}}-\text{OCH}_2\text{CH}_3$$

Titanium (IV) isopropoxide

TABLE 4

| Electrode coating compostion (wt %) | Comp. A | Comp. B | Comp. C | Comp. D | Comp. E | Comp. F |
|---|---|---|---|---|---|---|
| Palladium powder | 20 | 20 | 20 | 20 | 20 | 20 |
| Silver powder | 40 | 40 | 40 | 40 | 40 | 40 |
| Titanium alcoholate | 0.5 | 3.6 | 10 | 18 | 19 | 0 |
| Organic vehicle | 39.5 | 36.4 | 30 | 22 | 21 | 40 |

Calculation of content, for example, for tetraethoxytitanium:

|  | Molecular weight |
|---|---|
| $\text{Ti}(\text{OC}_2\text{H}_5)_4$ | 228 |
| Ti | 47.9 |

$$\frac{3.6 \times \frac{47.9}{228}}{40} \approx 1.9 \text{ wt \%} \qquad \frac{18 \times \frac{47.9}{228}}{40} \approx 9.5 \text{ wt \%}$$

The palladium powder and silver powder shown in Table 4 have particle diameters of 0.1 to 0.3 μm and 0.2 to 0.5 μm, respectively. As the titanium alcoholate, tetraethoxytitanium (Ti(OC$_2$H$_5$)$_4$), manufactured by Kojyundo-Kagaku, having a titanium content of 21 wt % was used. As the organic vehicle, a mixture of an ethyl cellulose resin and a solvent such as terpineol was used. The palladium powder and silver powder were preliminarily blended in the amounts specified in Table 4 to provide a silver-palladium powder mixture. The titanium alcoholate and the organic vehicle were then blended, and the silver-palladium powder mixture was admixed thereto. The resulting mixture was kneaded over a triple roll mill to prepare conductive pastes of compositions A to E, respectively. As a control, a conductive paste of composition F containing no titanium alcoholate was prepared. A predetermined pattern of internal electrodes were printed on 20 μm thick lead-containing conductive ceramic green sheets using these conductive pastes, and 60 such printed green sheets were stacked and press bonded, followed by cutting to provide unsintered stacked ceramic capacitors, respectively. After the unsintered stacked ceramic capacitors were heated to 300° to 400° C. so as to burn off the binder, they were further heated at a heating rate of 100° C./hour and maintained at 1,000° C. for 2 hours, followed by cooling at a rate of 100° C./hour to provide stacked ceramic capacitors.

The thus obtained stacked ceramic capacitors (30,000 pcs.) were examined for delamination and cracking. The results are as shown in Table 5.

TABLE 5

|  | Comp. A | Comp. B | Comp. C | Comp. D | Comp. E | Comp. F |
|---|---|---|---|---|---|---|
| Number of delaminated capacitors | 3 | 0 | 0 | 0 | 0 | 14 |
| Number of cracked capacitors | 0 | 0 | 0 | 0 | 0 | 3 |

As shown in Table 5, delamination and cracking can effectively be prevented by using a conductive paste containing titanium alcoholate in an amount of 1.9 to 9.5% by weight in terms of titanium based on the amount of silver.

If the amount of the titanium alcoholate is increased so as to increase the content of titanium relative to silver, viscosity of the resulting conductive paste will be reduced to lower workability. Therefore, the titanium is effectively added in the range as specified above.

As has been described heretofore, the incorporation of the silver-titanium alloy according to this invention can enhance adhesion between the ceramic portions and the internal electrodes and prevent delamination or cracking to be caused due to the difference in the level of sintering shrinkage and in thermal expansion coefficient, effectively, since the silver-titanium alloy contained in the conductive paste is present as such in the internal electrodes and the titanium moiety is oxidized into titanium oxide at the interface with the ceramic portion, whereby the titanium oxide portion is formed continuously with the silver-titanium alloy.

Further, the conductive paste containing a titanium alcoholate according to this invention can also prevent occurrence of structural defects such as delamination and cracking.

The reason why the titanium alcoholate can effectively prevent delamination can be explained as follows: The titanium alcoholate contained in the internal electrodes decomposes during burning off of the binder and sintering to allow the titanium to precipitate on the surface of the metal powder particles. While the titanium thus precipitated forms an alloy together with the silver, it is oxidized into titanium oxide at the interface with the ceramic portions. The titanium oxide is chemically bound firmly with the ceramic portions, so that the titanium oxide portion and titanium alloy portions can be formed continuously on the ceramic portions depending on the oxidation degree. Thus, adhesion between the ceramic portions and the internal electrodes can be enhanced to prevent defects such as delamination and the like to be caused by the difference in the level of sintering shrinkage and thermal expansion coefficient therebetween.

What is claimed is:

1. A conductive paste prepared by kneading a composition comprising silver metal powder, an organic vehicle, and a silver-titanium alloy powder contained in an amount of 0.1 to 6.0% by weight based on the amount of the silver metal powder.

2. The conductive paste according to claim 1 wherein said organic vehicle comprises an organic binder and a solvent.

3. The conductive paste according to claim 1 wherein said organic vehicle is present in an amount of about 47 to about 50% by weight.

4. The conductive paste according to claim 1 wherein said silver metal powder is present in an amount of about 35% by weight.

5. The conductive paste according to claim 1 wherein said conductive paste further includes palladium powder.

6. The conductive paste according to claim 5 wherein said palladium powder is present in an amount of about 15% by weight.

7. A conductive paste comprising a silver metal powder, an organic vehicle and 0.1 to 6.0% by weight, based on the amount of silver metal powder, of a silver-titanium alloy powder.

8. The conductive paste according to claim 7 wherein said organic vehicle comprises an organic binder and a solvent.

9. The conductive paste according to claim 7 wherein said organic vehicle is present in an amount of about 47 to about 50% by weight.

10. The conductive paste according to claim 7 wherein said silver metal powder is present in an amount of about 35% by weight.

11. The conductive paste according to claim 7 wherein said conductive paste further includes palladium powder.

12. The conductive paste according to claim 11 wherein said palladium powder is present in an amount of about 15% by weight.

* * * * *